United States Patent [19]

Hertler

[11] Patent Number: 4,978,723

[45] Date of Patent: Dec. 18, 1990

[54] PHOSPHONATE-CAPPED POLYMERS

[75] Inventor: Walter R. Hertler, Kennett Square, Pa.

[73] Assignee: E. I. Du Pont de Nemours and Company, Wilmington, Del.

[21] Appl. No.: 485,709

[22] Filed: Feb. 27, 1990

Related U.S. Application Data

[62] Division of Ser. No. 317,507, Mar. 1, 1989, Pat. No. 4,939,211.

[51] Int. Cl.$^5$ .............................................. C08F 8/12
[52] U.S. Cl. ............................... 525/326.5; 525/330.3; 525/330.6; 525/369; 525/378
[58] Field of Search ...................... 525/326.5, 369, 378, 525/330.3, 330.6

[56] References Cited

U.S. PATENT DOCUMENTS

| | | | |
|---|---|---|---|
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,621,125 | 11/1986 | Farnham et al. | 526/190 |
| 4,622,372 | 11/1986 | Dicker et al. | 526/190 |
| 4,656,226 | 4/1987 | Hutchins et al. | 525/93 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,681,918 | 7/1987 | Webster | 525/282 |
| 4,695,607 | 9/1987 | Spinelli | 525/272 |
| 4,711,942 | 12/1987 | Webster | 526/185 |
| 4,728,706 | 3/1988 | Farnham et al. | 526/172 |
| 4,732,955 | 3/1988 | Dicker | 526/188 |
| 4,736,003 | 4/1988 | Schneider et al. | 526/190 |
| 4,771,116 | 9/1988 | Citron | 526/194 |
| 4,771,117 | 9/1988 | Citron | 526/194 |
| 4,783,500 | 11/1988 | Webster | 524/555 |

OTHER PUBLICATIONS

Webster et al., "Group Transfer Polymerization—A New and Versatile Kind of Addition Polymerization", J. Am. Chem. Soc., 105, 5706 (1983).

Hertler et al., "Group Transfer Polymerization with Polyunsaturated Esters and Silylpolyenolates", J. Am. Chem. Soc., 110, 5841 (1988).

Sogah et al., "Group Transfer Polymerization. Polymerization of Acrylic Monomers", Macromolecules, 20, 1473 (1987).

T. Ishihara et al., Tetrahedron Lett., 26, 79 (1985).

Primary Examiner—Bernard Lipman

[57] ABSTRACT

Phosphate-capped polymers and a process for their preparation by contacting a silyl ketene acetal terminated polymer with vinyl phosphonates in the presence of a catalyst.

8 Claims, No Drawings

PHOSPHONATE-CAPPED POLYMERS

This is a division of application Ser. No. 7/317,507, filed Mar. 1, 1989, now U.S. Pat. No. 4,939,211.

BACKGROUND OF THE INVENTION

1. Field of the Invention

This invention relates to a process for converting polymers terminating in a silyl ketene acetyl group to polymers that are terminally substituted by phosphonate groups via the reaction of the SKA. terminated polymers with vinyl phosphonates in the presence of a catalyst. The resulting polymers are useful as dispersants for pigments in acrylic finishes.

2. Discussion of the Prior Art

The vinyl phosphonates and SKA terminated polymers that are employed in the process of the present invention are known or obvious compounds.

The polymers terminating in silyl ketene acetals that are reactants for this process may be "living" polymers prepared by Group Transfer Polymerization (GTP), (Webster et al., "Group Transfer Polymerization—A New and Versatile Kind of Addition Polymerization", J. Am. Chem. Soc., 105, 5706 (1983)), including "living" polyunsaturated polymers (Hertler et al., "Group Transfer Polymerization with Polyunsaturated Esters and Silylpolyenolates", J. Am. Chem. Soc., 110, 5841 (1988)). GTP methods are fully described in U.S. Pat. Nos. 4,414,372; 4,417,034; 4,508,880; 4,524,196; 4,581,428; 4,588,795; 4,598,161; 4,605,716; 4,621,125; 4,622,372; 4,656,233; 4,656,226; 4,659,782; 4,659,783; 4,681,918; 4,695,607; 4,711,942; 4,728,706; 4,732,955; 4,736,003; 4,771,116; 4,771,117; 4,783,500; and in commonly assigned U.S. patent application Ser. No. 4,831 filed Jan. 13, 1987 and allowed Oct. 31, 1988, and in U.S. patent application Ser. No. 7,758 filed Jan. 26, 1987 and allowed Aug. 25, 1988. These patents and applications disclose processes for polymerizing an acrylic or maleimide monomer to a "living" polymer in the presence of:

(i) an initiator having at least one initiating site and which is a tetracoordinate organo(Si, Sn or Ge) compound, including such compound having at least one oxygen, nitrogen or sulfur atom attached to Si; and (ii) a co-catalyst which is a source of fluoride, bifluoride, cyanide or azide ions or a suitable Lewis acid, Lewis basis or selected oxyanion.

The aforesaid patents and applications also disclose "capping" of "living" silyl ketene acetal groups with agents containing capping functions such as —CHO, —C(O)—, —NCO, —Br, —Cl and —TiCl$_3$.

U.S. Pat. No. 4,508,880 (listed above) also discloses the preparation of poly(methyl methacrylate) polymers that are terminally substituted by phosphonate groups at the initiator end of the polymer chain by using phosphonate substituted silyl ketene acetals to initiate methyl methacrylate polymerization. Sogah et al., "Group Transfer Polymerization. Polymerization of Acrylic Monomers". Macromolecules, 20, 1473 (1987) discuss this same reaction in detail.

T. Ishihara et al., Tetrahedron Lett., 26, 79 (1985) disclose the reaction of silyl vinyl ethers with 2-perfluoroalkyl-2-fluoro vinyl phosphonates in essentially equimolar amounts to yield either perfluoroalkylpropargyl alcohols or substituted divinyl ethers, depending on the order of addition of reagents. Also disclosed is the reaction of 2-perfluoroalkyl-2-fluoro vinyl phosphonates with 2.5 molar equivalents of silyl vinyl ether in acetonitrile to yield 4-alkylidene-1,3-dioxolane derivatives.

None of the prior art disclosures teach the reaction of O-silyl ketene acetals—nonpolymeric in nature, or at the end of a polymer chain—with vinyl phosphonates.

The α,ω-diphosphonate (alpha,omega-diphosphonate) substituted compounds made via the present invention are unknown in the prior art.

SUMMARY OF THE INVENTION

The present invention provides a process for the conversion of silyl ketene acetal (SKA) terminated polymers to phosphonate terminated polymers by reaction of the SKA terminated polymer with vinyl phosphonates in the presence of a catalyst which is a source of a selected anion or oxyanion. Said SKA terminated polymer is of the formula

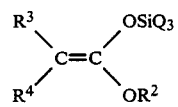

wherein:
each Q, independently, is selected from —R$^1$, —OR$^1$, —N(R$^1$)$_2$ and —SR$^1$;
each R$^1$, independently, is a hydrocarbyl or substituted hydrocarbyl radical;
R$^3$ is H, hydrocarbyl or substituted hydrocarbyl;
R$^2$ is hydrocarbyl or substituted hydrocarbyl;
R$^4$ is a polymeric radical;
said vinyl phosphonate is of the formula

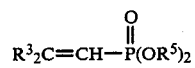

wherein:
R$^3$ is defined as above;
R$^5$ is R$^1$ or SiR$^1$$_3$.
The invention also resides in phosphonate terminated polymers having the formula

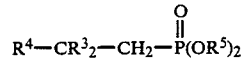

wherein:
R$^1$, R$^3$, R$^4$ and R$^5$ are defined as above.

DETAILED DESCRIPTION OF THE INVENTION

The present invention provides a process for the conversion of silyl ketene acetal (SKA) terminated polymers to phosphonate terminated polymers. In the process the SKA terminated polymer is reacted with vinyl phosphonates in the presence of a catalyst that is a source of anions or oxyanions. The SKA terminated polymer of the formula:

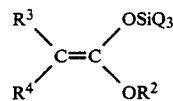

wherein:

each Q is independently selected from $R^1$, $-OR^1$, $-N(R^1)_2$ and $-SR^1$;

each $R^1$ is independently a hydrocarbyl or substituted hydrocarbyl radical;

$R^3$ is H, a hydrocarbyl or substituted hydrocarbyl radical;

$R^2$ is a hydrocarbyl or a substituted hydrocarbyl radical;

$R^4$ is a polymeric radical, contacted with a vinyl phosphonate of the formula:

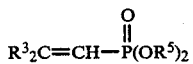

wherein:
$R^3$ is defined as above;
$R^5$ is $R^1$ or $SiR^1_3$ in the presence of an anion or oxyanion catalyst.

The invention also resides in novel phosphonate terminated polymers having the following formula:

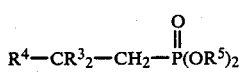

wherein:
$R^1$, $R^3$, $R^4$ and $R^5$ are defined as above.

By "hydrocarbyl radical" is meant a radical consisting essentially of hydrogen and up to about 20 carbon atoms. By "substituted hydrocarbyl radical" is meant a hydrocarbyl also containing one or more functional substituents that are inert under reaction conditions and/or ether oxygen within aliphatic segments thereof.

By "polymeric radical" is meant a polymeric moiety containing more than 20 carbon atoms; said radical may contain intra-chain heteroatoms O, N, or S and/or non-functional or functional substituents that are inert under reaction conditions.

By "selected anion or oxyanion" is meant a fluoride, fluorotrimethylsilicate, bifluoride, cyanide, or azide anion, or an oxyanion defined as in U.S. Pat. No. 4,588,795. The selected anion or oxyanion catalysts are also Group Transfer Polymerization catalysts described in the previously cited GTP patents and applications, especially in U.S. Pat. Nos. 4,508,880 and 4,588,795.

Preferred SKA terminated polymers are those of the formula:

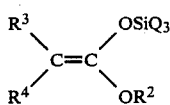

wherein:
Q is $-R^1$, and $R^1$ is $C_{1-8}$ alkyl or aryl, most preferably methyl;
R2 is C1-8 hydrocarbyl;
R3 is methyl;
R4, a polymeric radical, is, preferably, a substituted polymeric radical, more preferably the substituent is ester or protected hydroxyl; preferably the polymeric radical is comprised of acrylic monomer units, more preferably methacrylate monomer units, and most preferably, methyl methacrylate units.

These most preferred SKA terminated polymers are "living" polymers prepared by Group Transfer Polymerization of methyl methacrylate.

Preferred vinyl phosphonates are those wherein $R^3$ is H and $R^5$ is $Si(CH_3)_3$ or $R^3$ is H and $R^5$ is $C_{1-8}$ alkyl or aryl, most preferably ethyl.

Preferred catalysts are sources of fluoride, bifluoride or selected oxyanions; bioxyanions, especially biacetate, are most preferred.

A preferred form of the phosphonate terminated polymer is

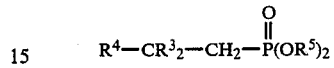

wherein:
$R^4$ is derived from acrylic monomer units most preferably methyl methacrylate units, and $R^5$ is $Si(CH_3)_3$.

The trimethylsilyl substituted phosphonate group is preferred because of its facile conversion into a phosphonic acid group (i.e., $R^5=H$) via hydrolysis.

Phosphonate terminated polymers of the above structure when $R^4$ is derived from acrylic monomer units, or vinyl acrylic monomer units (e.g., alkylsorbate units), are believed to be novel. The polymers when $R^5$ is trimethylsilyl or the phosphonic acid hydrolysis products are also believed to be novel.

Substituents that are unreactive under reaction conditions include, but are not limited to, $-CO_2R$, $-OC(O)R^1$, $-N(R^1)_2$, $-C(O)NR^1_2$, $-CN$, $-CH=CH_2$ provided such groups are not conjugated with carbonyl, cyano, or phosphonate groups, $-P(O)(OR^1)_2$, $-C(O)R^1$, and $-OH$ and $CO_2H$ if chemically protected; R is hydrocarbyl other than aryl, and $R^1$ is as defined above.

In the present invention process, a solvent is desirable but is not essential unless neither reactant is a liquid. Suitable solvents are those described in the aforesaid GTP patents and applications; aprotic liquids such as tetrahydrofuran (THF), toluene, benzene and the glymes are preferred. Solvent mixtures may be especially suitable.

Total reactant concentration should be at least about 1% (w/v), preferably in the range 5-60% (w/v).

The process of the invention is carried out at a temperature of about $-100°$ C. to $+150°$ C., preferably about $-15°$ C. to about $+80°$ C.

In a preferred application of the process of the present invention, Group Transfer Polymerization is carried out with a functionalized initiator, as described in Sogah et al., Macromolecules, 20, 1473 (1987), more preferably with a phosphorous containing ketene silyl acetal, e.g. bis(trimethylsilyl)-3-methoxy-3-trimethylsilyloxy-2-propene-1-phosphonate $((CH_3)_3SiO)_2P(O)CH_2C(CH_3)C=C(OCH_3)OSI(CH_3)_3$ to yield, when, for example, methyl methacrylate is the chosen monomer, the intermediate polymeric product

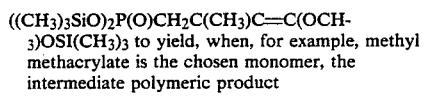
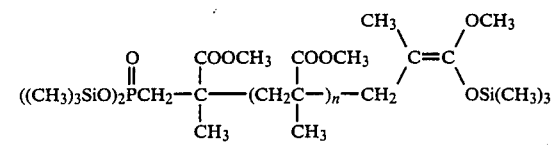

which, after undergoing the process of the present invention with bis(trimethylsilyl) vinyl phosphonate,

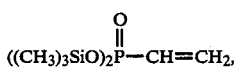

is converted to the alpha, omega-di(bis(trimethylsilyl)-phosphonato)- compound

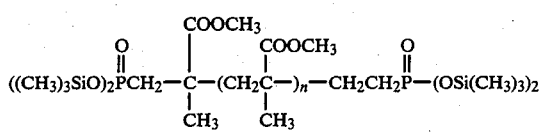

After hydrolysis, the novel alpha,omega diphosphonic acid is formed.

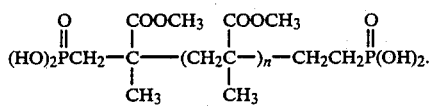

The products of the process are useful as dispersants, i.e., for dispersants for pigments in acrylic finishes.

In the following examples of the invention process, parts and percentages are by weight and temperatures are in degrees Celsius unless otherwise specified.

Drying of equipment and gases

All glassware, including syringes and syringe needles, were dried in a 165° C. oven overnight prior to use. Argon (Air Products) was purified by passage through a molecular sieve trap for drying and a reduced Girdler G-33 nickel oxide catalyst trap from United Catalyst, Inc., for removal of oxygen.

Polymerizations and subsequent reactions were performed in glass reaction flasks under an argon atmosphere using syringe techniques for introduction of liquid reactants and solvents. Stirring was effected by a magnetic stirrer.

Glassware was assembled while hot, flushed with argon with additional external heating, and then maintained at room temperature (RT) under a slightly positive pressure of argon. The joints of the glassware were connected without grease and wrapped with "Parafilm M" laboratory film. Serum caps, for syringe introduction of solvents and reagents, were secured onto openings in the glassware by tightly-wrapped nylon ties.

Chemicals

Methyl Methacrylate (MMA, Aldrich Chemical Co.) was purified and dried by passage through a column of anhydrous alumina, neutral grade (Woelm), under an argon atmosphere and stored under a slight positive pressure of argon until used. Tetrahydrofuran (THF) was dried over sodium and distilled from sodium benzophenone ketyl immediately before use. Acetonitrile was dried by distillation from phosphorous pentoxide. Initiators were distilled in a 12 inch spinning band column. Dried solvents, initiators, and catalyst solutions were stored in "Aldrich" bottles in drierite-packed desiccators. Tris(dimethylamino)sulfonium bifluoride (TASHF) was prepared as in Sogah et al., Macromolecules, 20, 1473 (1987). Bis(trimethylsilyl) vinyl-phosphonate was prepared according to literature references: (C. E. McKenna, M. T. Higa, N. H. Cheung, M-C. McKenna, Tet. Lett. 1977, 155. H. Gross, C. Boeck, B. Costisella, J. Gloeda, J. Fur. Prakt. Chem. 1978, 320, 344).

Analyses $^1$H-NMR spectra were recorded with a Nicolet 360WB spectrometer. Molecular weights of polymers were determined by gel permeation chromatography (GPC) using a Waters Associates GPC with a 590 pump, 401 Refractive Index detector and 4 Microstyrogel columns, 100,000, 10,000, 500 and 100. Polydispersity (D) is given by formula D=$\overline{M}_w$/$\overline{M}_n$ where /w and /n are, respectively, weight and number-average molecular weight.

EXAMPLE 1

Preparation of Poly(Methyl Methacrylate) Having a Terminal Diethyl Phosphonate Group A solution of 0.5 mL (2.5 mmol) of 1-methoxy-1-trimethylsiloxy-2-methyl-1-propene, and 200 μL of tetrabutylammonium bibenzoate (0.1 M in THF) in 30 mL of THF was prepared. To this was added 10.8 mL (100 mmol) of methyl methacrylate at a rate such that the temperature remained at about 35° C. Fifteen minutes after the end of the polymerization exotherm, 0.46 mL (3 mmol) of diethyl vinylphosphonate was added. After 5 min, 30 μL of TASHF$_2$ (1 M in acetonitrile) was added to ensure adequate catalyst A sample of the reaction mixture was removed for analysis. NMR analysis showed no residual MMA. GPC analysis of the reaction mixture showed that the resulting polymer had $\overline{M}_n$ 3740, $\overline{M}_w$ 5420, D=1.45 (theory $\overline{M}_n$=4250). The Polymer was precipitated with hexane and reprecipitated from THF with aqueous methanol to give 9.8 g of poly(methyl methacrylate), PMMA, with a terminal diethyl phosphonate group. GPC analysis of the precipitated polymer gave $\overline{M}_n$ 4610, $\overline{M}_w$ 5590, D=1.21.

Anal. Calcd. for $C_{226}H_{366}O_{91}P$: C=59.39, H=8.07, P=0.68. Found: C=59.38, H=7.89, P=0.39.

EXAMPLE 2

Preparation of Poly(Methyl Methacrylate)-alpha,omega-diphosphonic Acid (a) A solution of 0.593 g (0.58 mL, 2 mmol) of diethyl 3-methoxy-3-trimethylsiloxy-2-propene-1-phosphonate, 40 μL of TASHF$_2$ (1 M in acetonitrile) and 30 mL of THF was prepared. To this was added dropwise 10.8 mL (100 mmol) of MMA. To increase the rate of polymerization, an additional 40 μL of 1 M TASHF$_2$ in acetonitrile was added, and the temperature rose to 46° C. When the reaction temperature had fallen to 27° C., 0.92 mL (6 mmol) of diethyl vinyl-phosphonate was added followed by 40 μL of TASHF$_2$ (1 M in acetonitrile). After stirring overnight, the polymer was precipitated with hexane, dissolved in methylene chloride, washed with brine, dried, and evaporated to yield 9.7 g of polymer, $\overline{M}_n$ 12,500, $\overline{M}_w$ 16,600, D=1.32. The polymer was dissolved in THF and precipitated with aqueous methanol to give 7.2 g of PMMA with terminal diethyl phosphonate groups Anal. Calcd. for $C_{624}H_{1005}P_2O_{252}$ (d.p. 122): C=59.48, H=8.04, P=0.49. Found: C=59.20, H=7.89, P=0.55.

(b) A solution of 5 g of the polymeric bis-(phosphonic ester) prepared in part a in 20 mL of methylene chloride was treated with 1 g (0.85 mL, 6.5 mmol) of bromotrimethylsilane. After 2 hrs the solution was evaporated, and the residue was treated with 20 mL of THF and 3 mL of 10% hydrochloric acid in methanol. After 1 hr, precipitation with aqueous methanol gave 4.7 g of poly(methyl methacrylate) with two terminal phosphonic acid groups. NMR analysis of the polymer showed that no trimethylsilyl groups were present.

Anal. Calcd. for $C_{616}H_{989}P_2O_{252}$ (d.p. 122): C=59.24, H=7.98, P=0.50. Found: C=58.95, H=7.91, P=0.50.

Acid Number: Calcd. 8.98.
Found: 8.44.

EXAMPLE 3

Preparation of Random Copolymer of MMA and n-Butyl Methacrylate with a Terminal Phosphonic Acid Group A solution of 1 mL (5 mmol) of 1-methoxy-1-trimethylsiloxy-2-methyl-1-propene, and 0.132 mL of tetrabutylammonium m-chlorobenzoate (0.38 M in THF), in 75 mL of THF was prepared. To this was added a mixture of 12.5 g (13.35 mL, 125 mmol) of MMA and 2.5 g (14 mL, 87.9 mmol) of n-butyl methacrylate at a rate such that the temperature remained near 30° C. When the monomer mixture had all been added, and 15 min after the temperature had returned to room temperature, a sample removed for NMR analysis showed no residual monomers. GPC analysis showed $\overline{M}_n$ 5390, $\overline{M}_w$ 5990, D=1.11 (theory $\overline{M}_n$=5252). Then 5 g (20 mmol) of bis(trimethylsilyl) vinylphosphonate (prepared from the reaction of bromotrimethylsilane with diethyl vinylphosphonate) was added, followed by 4 additions of 200 μL TASHF$_2$ (0.1 M in propylene carbonate). A sample was removed for analysis. NMR analysis showed residual vinylphosphonate. GPC analysis showed $\overline{M}_n$ 5840, $\overline{M}_w$ 6240, D=1.067. The polymer was precipitated with hexane to give a gummy polymer. This was redissolved in the minimum amount of THF and reprecipitated with hexane to yield 23.6 g of copolymer. NMR analysis showed 1.35 MMA units per butyl methacrylate unit (theory 1.42:1). The copolymer was dissolved in 70 mL of THF and treated with 5 mL of water and stirred 1.5 hr. After precipitation with 1:1 methanol:water, the resulting polymer (205 g) was dissolved in 50 mL of THF and treated with 5 mL of water and 0.5 g of p-toluenesulfonic acid and stirred for 2 hrs. Precipitation with aqueous methanol gave copoly(methyl methacrylate, n-butyl methacrylate) with a terminal phosphonic acid group.

Anal Calcd. for $C_8H_{14}O_2)_{18}$ $(C_5H_8O_2)_{25}$ $C_2H_6PO_3$ i.e., $C_{279}H_{458}O_{89}P$: C=62.94, H=8.93, P=0.60. Found: C=63.59, H=8.95, P=0.32.

Acid Number: Calcd. 11.16.
Found: 12.22.

As many differing embodiments of this invention may be made without departing from the spirit and scope thereof, it is to be understood that this invention is not limited to the specific examples described herein, except as defined in the appended claims.

What is claimed is:

1. A process for conversion of silyl ketene acetal (SKA) terminated polymers to phosphonic acid terminated polymers by contacting a silyl ketene acetal terminated polymer of the formula $$\begin{array}{c} R^3 \\ \phantom{R^3}\diagdown \\ \phantom{xx}C=C \\ \diagup\phantom{xxx}\diagdown \\ R^4\phantom{xxxxx}OR^2 \end{array} \begin{array}{c} OSiQ_3 \\ \diagup \\ \phantom{x} \end{array}$$

wherein:
each Q, independently, is selected from $-R^1$, $-OR^1$, $-N(R^1)_2$ and $-SR^1$;
each $R^1$, independently, is a hydrocarbyl or substituted hydrocarbyl radical;
$R^3$ is H, hydrocarbyl or substituted hydrocarbyl;
$R^2$ is hydrocarbyl or substituted hydrocarbyl;
$R^4$ is a polymeric radical;
with a vinyl phosphonate of the formula $$R^3{}_2C=CH-\overset{O}{\underset{\|}{P}}(OR^5)_2$$

wherein:
$R^3$ is defined as above;
$R^5$ is $SiR^1{}_3$;
in the presence of a catalyst which is a source of a selected anion or oxyanion; and optionally, in the presence of a solvent; followed by treating the product with a hydrolizing agent to convert $R^5$ to H.

2. The product resulting from the process of claim 1.

3. A phosphonate terminated polymer of the formula $$R^4-CR^3{}_2-CH_2-\overset{O}{\underset{\|}{P}}(OR^5)_2$$

wherein:
$R^3$ is H, a hydrocarbyl or a substituted hydrocarbyl radical;
$R^4$ is a polymeric radical containing more than 20 carbon atoms derived from acrylic monomer units;
$R^5$ is $Si(CH_3)_3$ or $R^1$; and
$R^1$ is a hydrocarbyl or substituted hydrocarbyl radical.

4. The polymer of claim 3 wherein the $R^4$ is a radical derived from methyl methacrylate.

5. A solution of the polymer of claim 3 dissolved or dispersed in an aprotic solvent.

6. A film prepared from the solution of claim 5.

7. A phosphonate terminated polymer according to the formula of claim 3 with the structure:

$$((CH_3)_3SiO)_2\overset{O}{\underset{\|}{P}}CH_2-\underset{\underset{CH_3}{|}}{\overset{\overset{COOCH_3}{|}}{C}}-(CH_2\underset{\underset{CH_3}{|}}{\overset{\overset{COOCH_3}{|}}{C}}-)_n-CH_2CH_2\overset{O}{\underset{\|}{P}}-(OSi(CH_3)_3)_2.$$

8. The product of claim 2 having the structure:

$$(HO)_2\overset{O}{\underset{\|}{P}}CH_2-\underset{\underset{CH_3}{|}}{\overset{\overset{COOCH_3}{|}}{C}}-(CH_2\underset{\underset{CH_3}{|}}{\overset{\overset{COOCH_3}{|}}{C}}-)_n-CH_2CH\overset{O}{\underset{\|}{P}}(OH)_2.$$

* * * * *

UNITED STATES PATENT AND TRADEMARK OFFICE
CERTIFICATE OF CORRECTION

PATENT NO. : 4,978,723
DATED : December 18, 1990
INVENTOR(S) : Walter R. Hertler It is certified that error appears in the above-indentified patent and that said Letters Patent is hereby corrected as shown below:

Column 4, line 55, the hyohen following "bis(trimethylsilys)" should be replaced with a space.

Column 6, line 28, there should be a period following "catalyst".

Signed and Sealed this

Twenty-fourth Day of May, 1994

Attest:

BRUCE LEHMAN

Attesting Officer        Commissioner of Patents and Trademarks